(12) United States Patent
Sanchez et al.

(10) Patent No.: US 7,470,731 B2
(45) Date of Patent: Dec. 30, 2008

(54) FLUORESCENT INK

(75) Inventors: Luis A. Sanchez, Hamden, CT (US); Jay Reichelsheimer, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 593 days.

(21) Appl. No.: 11/166,887

(22) Filed: Jun. 24, 2005

(65) Prior Publication Data
US 2006/0293409 A1    Dec. 28, 2006

(51) Int. Cl.
*C09D 11/00*    (2006.01)
(52) U.S. Cl. ........................ 523/160; 523/161
(58) Field of Classification Search ................. 523/160, 523/161
See application file for complete search history.

(56) References Cited

U.S. PATENT DOCUMENTS 6,288,222 B1    9/2001    Roth

2003/0032699 A1*    2/2003    Wakabayashi et al. ...... 523/160
2003/0177941 A1    9/2003    Barbera-Guillem
2005/0068395 A1    3/2005    Haubold

FOREIGN PATENT DOCUMENTS

| EP | 1314766 A | 5/2003 |
| WO | WO99/52708 A | 10/1999 |
| WO | WO2004/064751 A | 8/2004 |

* cited by examiner

*Primary Examiner*—Edward J Cain
(74) *Attorney, Agent, or Firm*—George M. Macdonald; Angelo N. Chaclas

(57) ABSTRACT

A water-based ink for use in an ink jet printer for printing machine-readable indicia on a substrate is disclosed. The ink jet ink comprises fluorescent nanoparticles having a diameter between about 30 nm and about 100 nm; and an aqueous liquid vehicle. The aqueous liquid vehicle comprises water and a water soluble vehicle in sufficient amounts to achieve an ink viscosity and surface tension effective for application of the ink jet ink to the substrate in a predetermined pattern by ink jet printing.

13 Claims, 1 Drawing Sheet

FLUORESCENT INK

BACKGROUND OF THE INVENTION

1. Field of the Invention

The present invention relates to inks and, more particularly, to fluorescent inks.

2. Background Information

In the machine processing of various types of substrates, such as tickets, labels, postage imprints, and tags, it is generally known to employ detectors which are responsive to colors, and in many cases to the fluorescent emissions of an ink which may be the result of ultraviolet light excitation. For example, in the postage meter art, a red fluorescent ink is often provided for the machine reading of processed mail. Fluorescent colored inks are those in which the ink exhibits a first color, such as blue, black or green, in the visible spectrum and a second color when subjected to ultraviolet light.

Certain drawbacks exist with some prior fluorescent inks. For example, some are made with fluorescent dyes, resulting in prints that are fugitive to light and water. It is also difficult to obtain stable, non-clogging dispersions with some fluorescent inks.

Accordingly, there is a need for improved fluorescent ink jet inks.

SUMMARY OF THE INVENTION

In accordance with one embodiment of the invention, a water-based ink for use in an ink jet printer for printing machine readable indicia on a substrate is disclosed. The ink jet ink comprises fluorescent nanoparticles having a diameter between about 30 nm and about 100 nm; and an aqueous liquid vehicle. The aqueous liquid vehicle comprises water and a water-soluble vehicle in sufficient amounts to achieve an ink viscosity and surface tension effective for application of the ink jet ink to the substrate in a predetermined pattern by ink jet printing.

BRIEF DESCRIPTION OF THE DRAWING

The foregoing aspects and other features of the present invention are explained in the following description, taken in connection with the accompanying drawing, wherein.

DETAILED DESCRIPTION OF THE PREFERRED EMBODIMENTS

Figure 1:
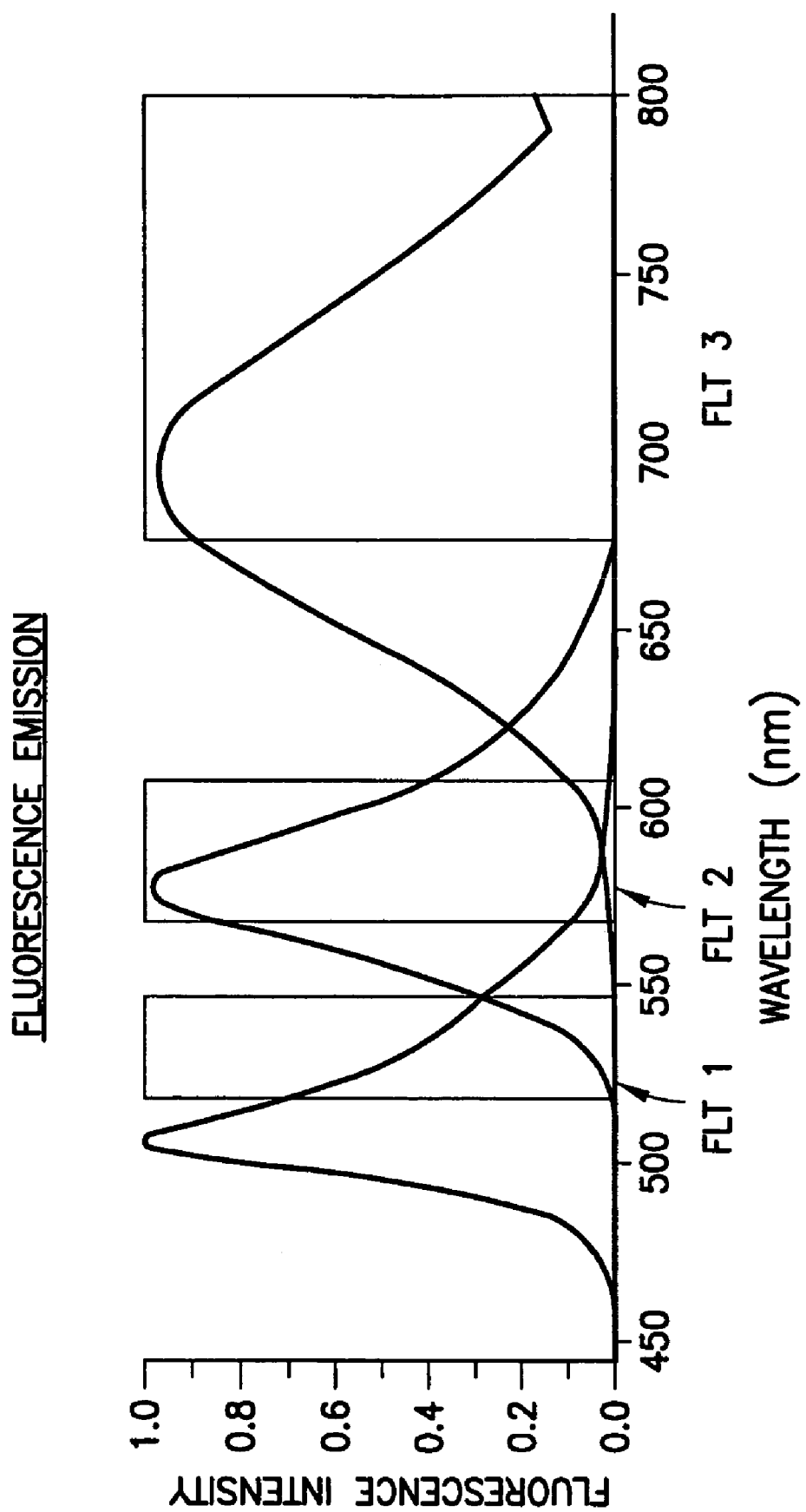
FIG. 1 illustrates a graph of fluorescent emission.

Although the present invention will be described with reference to the embodiments described herein and those shown in the drawing, it should be understood that the present invention can be embodied in many alternate forms of embodiments. In addition, any suitable size, shape or type of elements or materials could be used.

In accordance with an embodiment of the invention, a water-based ink for use in an ink jet printer for printing machine readable indicia on a substrate is disclosed.

The ink comprises fluorescent nanoparticles having a diameter between about 30 nm and about 100 nm in amounts between about 1 and about 10 weight percent. The small particle size or pigment size of these nanoparticles advantageously imparts good fastness (water and light) properties, as well as increased stability of the ink jet ink. Ink jet printers are being manufactured with smaller nozzles for higher resolution. As the nozzle size decreases, prior pigmented inks may become unreliable and cause clogging of the nozzles due to agglomeration. However, inks including the fluorescent nanoparticles described herein overcome this problem. For example, prior particles may generally be about 10-50× smaller than the ink jet nozzle, while the nanoparticles described herein may be about 100-250× smaller, which is advantageous in preventing physical clogging of the ink jet nozzles. Moreover, the small particles are stable when dispersed in water and have increased water fastness and light fastness in comparison to some conventional fluorescent dyes.

The fluorescent nanoparticles may be made of any desired shaped material, although spherical shaped particles are preferred. The fluorescent nanoparticles preferably comprise polymeric-based nanoparticles, stained with one or more fluorescent and/or phosphorescent dyes. For example, suitable polymeric materials include polystyrene, polyacrylonitrile, latex, carbohydrate-based polymers, polyaliphatic alcohols, poly(vinyl) polymers, polyacrylic acids, polyorganic acids, polyamino acids, co-polymers, block co-polymers, tert-polymers, polyethers, naturally occurring polymers, polyamides, surfactants, polyesters, branched polymers, cyclopolymers, polaldehydes, and combinations thereof, among others. Other suitable polymers include, but are not limited to, polyacrylic acid, polyamide, polyacrylamide, polyacrolein, polybutadiene, polycaprolactone, polyester, polyethylene, terephthalate, polydimethylsiloxane, polyisoprene, polyurethane, polyvinylacetate, polyvinylchloride, polyvinylpyridine, polyvinylbenzylchloride, polyvinyltoulene, polyvinylidene chloride, polydivinylbenzene, olymethylmethacrylate, polyactide, polyglycolide, poly (lactide-co-glycolide), polyanhydride, polyorthester, polyphosphazene, polyphosophaze, and combinations thereof.

Any suitable fluorescent and/or phosphorescent dye may be employed to stain the nanoparticles. One skilled in the art would know how to select a desired dye based upon desired emission and absorption properties, as well as other properties, as appropriate. For example, suitable fluorescent dyes include, but are not limited to, the general class known as cyanine dyes, having emission wavelengths between about 500 nm and 900 nm. Other fluorescent and phosphorescent dyes include, but are not limited to, the following classes: Xanthene, Naphtalimides, Coumarins, Quinazolinones, Oxazines, Thiazines, Thioxanathines, Naphtholactam, Azlactone, Methine, Perylenes, Benzoxinones, etc.

Fluorescent staining of polymeric nanoparticles may be achieved by any of the techniques familiar to those skilled in the art. For example, covalent attachment of dyes onto the surface of the particles; internal incorporation of the dye during particle polymerization and; dyeing after the particle has been polymerized. See, for example, U.S. Pat. No. 6,268,222.

Fluorescent nanoparticles are available from several companies, such as Cromeon and Fluka Biosciences, both in Germany. The nanoparticles may be produced with a variety of colors (emission), excitation energy and base polymers. Tables 1 and 2 provide examples of suitable fluorescent dyes/polymeric bead combinations from Cromeon and Fluka Biosciences, respectively.

TABLE 1

| Product No. | Name Chromeon | Absorption nm | Emission nm | ε L/(mol/cm) | Q.Y. % |
|---|---|---|---|---|---|
| 650-x | 444 | 424 | 473 | 20 000 | 10 |
| 651-x | 482 | 482 | 502 | 15 000 | 25 |
| | | | | | 22* |

TABLE 1-continued

| Product No. | Name Chromeon | Absorption nm | Emission nm | ε L/(mol/cm) | Q.Y. % |
|---|---|---|---|---|---|
| 705-x | 494 | 494 | 628 | 20 000 | 7 |
|  |  |  |  |  | 10* |
| 701-x | 495 | 495 | 605* | 20 000 | <1 |
|  |  | 545 | 583 | 50 000 | 4* |
|  |  |  |  |  | 7 |
| 703-x | 520 | 512 | 632* | 15 000 | <1 |
|  |  |  |  |  | 2* |
| 702-x | 521 | 521 | 637* | 35 000 | <1 |
|  |  | 554 | 666 | 20 000 | 6* |
|  |  |  |  |  | 20 |
| 150-x | 545 | 557 | 573 | 100 000 | 40 |
| 152-x | 546 | 545 | 561 | 110 000 | 8 |
|  |  |  |  |  | 11* |
| 704-x | 568 | 570 | 678* | 20 000 | <1 |
|  |  | 608 | 680 | 40 000 | 3* |
|  |  |  |  |  | 5 |
| 221-x | 641 | 641 | 659 | 280 000 | 85 |
| 100-x | 642 | 642 | 660 | 170 000 | 17 |
|  |  | 653 | 653 | 675 | 100 000 | 47 |
| 220-x | 641 | 641 | 658 | 230 000 | 84 |
| 225-x | 661 | 661 | 716 | 110 000 | 0 |
| 170-x | 783 | 783 | 800 | 100 000 | 1* |

TABLE 2

| Name | Abs 545 nm/ Em 565 nm | Abs 642 nm/ Em 662 nm | Abs 470 nm Em 615 nm |
|---|---|---|---|
| PAN beads | 65779 | 83393 | 30166 |
| PD beads | 66392 | 83394 | 43187 |
| PAN beads Streptavidin | 80347 | 06245 | N/A |
| PD beads Streptavidin | 74036 | 91915 | N/A |

The ink jet ink also comprises an aqueous liquid vehicle comprising water and a water-soluble vehicle in sufficient amounts to achieve an ink viscosity and surface tension effective for application of the ink jet ink to a substrate in a predetermined pattern by ink jet printing.

Water is desirable as the main solvent due to the large number of plastic materials used for ink jet printer parts. These parts include inker foam, glue, printer base, cartridge materials, etc. The above parts may be made from acrylonitrile styrene (AS), polymethyl methacrylate (PMMA) and acrylonitrile butadiene styrene (ABS). Thus, a disadvantage of using only organic-based solvents is that they may attack the plastic materials and interfere with the proper functioning of the parts.

Water may typically be present in an amount between about 50 and about 90 weight percent, although other suitable amounts may be employed.

The ink viscosity and surface tension of the ink jet ink should be such that it is effective for application of the ink jet ink to a substrate in a predetermined pattern by ink jet printing. For example the viscosity of the ink jet ink for use in some piezoelectric inkjet printers may be between about 1 and about 20 cps, and may be lower for thermal ink jet printers, such as between about 1 and about 5 cps. A desirable surface tension of the ink jet ink may be between about 30 and about 50 dynes/cm.

The water soluble vehicle comprises one or more organic solvents, among other optional suitable constituents. The dyed nanoparticles may be diluted with a number of solvents including, but not limited to, water, ketones, acetates, glycols, glycol ethers, alcohols, and mixtures thereof. Preferably, the dyed nanoparticles are diluted with solvents, such as polyvinylpyrrolidone, triethylene glycol mono butyl ether, diethylene glycol, dipropyline glycol, methyl ethyl ketone, or any other standard inkjet diluent or mixture of diluents. It may also be possible to dilute the dyed nanoparticles with water alone, prior to use. The final weight percent of the dyed nanoparticles in the ink formulation may vary, but typically may be from about 0.1 to about 15 weight percent of the formulation, and preferably from about 1.0 to about 10 weight percent, most preferably about 5 weight percent.

Other constituents may be employed within the ink formulations, such as those disclosed in U.S. Pat. Nos. 6,005,002, 5,674,314 and 5,919,846, and U.S. Publication Numbers 2002/0195586A1 and 2003/0005303A1. The contents of 2003/0005303A1 are hereby incorporated by reference.

As a non-limiting example, the ink carriers for the dyed nanoparticles used in the ink formulations may contain at least about 65 wt. percent water. Other suitable solvents/additive categories may include the following: fluorescence stabilizers (FS), which are additives for maintaining and enhancing fluorescence. The following solvents provide a considerable enhancement of fluorescence: N, N-Dimethylacetamide, sulfolane, formamide, methylphenyl sulfoxide, N-methylpyrrolidinone, 4-Methylmorpholine N-oxide (MNNO) and Dimethylsulfoxide (DMSO). From the foregoing list, MNNO is believed to have the best ability to achieve long term increased fluorescence. MNNO is a known solvent for cellulose and aids penetration into the fibers of the paper, which may increase the fluorescence in a selective and long lasting manner.

Polar low molecular weight resins (PLMWR), such as polyvinylpyrrolidone (MW 15000) and polyethyleneglycols, may also be employed in the ink formulations to enhance and stabilize the fluorescence. Other water soluble resins with good solvent characteristics for dyes include polyvinylalcohol, poly N,N-dimethylhydantoin, polyacrylates, among others.

The ink formulations may further include surfactants (S), such as long chain surfactants of dodecylbenzenesulphonic acid.

Glycol ethers (GE), such as triethylene glycol mono butyl ether (BTG), may also be included to enhance color and fluorescence by internal hydrogen bonding and improved penetration into the paper. Other suitable glycols include triethylene glycol n-butyl ether (BTG), tripropylene glycol methyl ether (TPM), diethylene glycol n-butyl (DB), diethylene glycol methyl ether (DM), dipropylene glycol methyl ether (DPM).

Other constituents, such as amines (A), may be included in the ink formulations to, for instance, prevent the aggregation of the dyes, improve solubility in water/glycol/ether mixtures and help to maintain constant viscosity during long periods of rest. Suitable amines include triethanol amine, ethanol amine, diethanolamine, trisopropanolamine, butyldiethanolamine, N,N dimethylethanolamine, N,N diethylethanolamine, N,N dipropylethanolamine, among others.

Ink formulations including the afore-described dyed nanoparticles may be made by any suitable method known in the art for producing inks. For example, the ink formulations may be obtained by addition of the highest percentage component by weight of stock solutions prepared from all components in water until completely dissolved into a container, and then subsequent additions of the largest percent by weight component until all of the components are added to a mixing container. The ink may be vacuum filtered with use of conventional filters, such as a 5-micron polyvinylidene fluoride membrane filter from Millipore, to remove any large solids prior to printing. The ink formulation constituents may be combined and stirred until a homogeneous ink formulation is obtained.

Ink formulations employing the dyed nanoparticles described herein are particularly useful in producing dark, machine-readable markings exhibiting fluorescence when exposed to fluorescent-excitation radiation upon printing by ink jet printing mechanisms.

Additionally, as the nanoparticles are typically invisible due to their small size, they may be used to make fluorescent inks which are invisible if their concentration is most preferably kept at a concentration of approximately, but not limited, to 2 weight percent or less. The nanoparticles themselves are slightly colored but by keeping the concentrations low this visible color can not be seen by the naked eye. Thus, the nanoparticles may be invisible when applied to, for instance, a paper substrate at concentrations suitable for ink jet ink application, such as less than about 10 weight percent, preferably about 5 weight percent or less, and most preferably about 2 weight percent or less.

The present invention will be further described by way of example, which is meant to be merely illustrative and therefore not limiting.

EXAMPLE 1

This illustrates a nonlimiting example of an invisible fluorescent ink jet ink comprising the following constituents, in approximate weight percent:

| Amt. | Constituent |
|---|---|
| 0.2 | Triethanolamine |
| 2 | Fluorescent nanoparticles |
| 5 | Triethylene Glycol Mono-n-Butyl Ether |
| 10 | Ethylene Glycol |
| 82.8 | Distilled Water |

The ink in Example 1 contains: a pH adjustor, fluorescent nanoparticles, a co-solvent, a humectant, and water as the carrier. When printed with an inkjet printer, an invisible fluorescent mark is left on the paper. By using the proper excitation wavelength, the fluorescent mark can be easy viewed.

Additionally, for a visible red ink, a higher concentration of fluorescent nanoparticles can be used or red dyes such as Basic Red 1 or Acid Red 52 can be added. The concentration needed to produce a visible color is highly dependent on the type of nanoparticles used. One skilled in the art could readily determine the correct concentration based on the disclosures herein.

EXAMPLE 2

| Amt. | Constituent |
|---|---|
| 0.2 | Triethanolamine |
| 10 | Fluorescent nanoparticles |
| 5 | Triethylene Glycol Mono-n-Butyl Ether |
| 10 | Ethylene Glycol |
| 74.8 | Distilled Water |

The ink in Example 2 is similar in construct to Example 1 as the ink contains a pH adjuster, a co-solvent, a humectant, and water. The concentration of the flourescent nanoparticles has been increased so that their visible color is apparent.

EXAMPLE 3

| Amt. | Constituent |
|---|---|
| 0.2 | Triethanolamine |
| 2 | Acid Red 52 |
| 2 | Fluorescent nanoparticles |
| 5 | Triethylene Glycol Mono-n-Butyl Ether |
| 10 | Ethylene Glycol |
| 80.8 | Distilled Water | the ink in Example 3 is similar in construct to Example 1 as the ink contains a pH adjuster, fluorescent nanoparticles, a co-solvent, a humectant, and water. A red dye has been added to give the ink a visible red color.

Advantages of embodiments of the invention include flourescent inks that have improved water and light-fastness over conventional dyes due, in part, to the small size of the particles. These smaller particles have increased long term stability and result in less clogging of ink jet nozzles.

Further advantages include the individual nanoparticles having high fluorescence that aggregate in paper to produce high bulk fluorescence. Moreover, the nanoparticles described herein, in accordance with embodiments of the invention, are stable and can be easily incorporated into inks.

Nanoparticles described herein can be used alone to produce the bulk fluorescence and/or can be used in smaller quantities in an ink as a taggant or marker. For example, in accordance with further embodiments of the invention, multiple nanoparticles with differing emission wavelengths can be used in an ink as a taggant for coding. The intensity of the fluorescence will depend on the number of fluorescent particles. Examining the spectral intensity and wavelength of the peaks can generate unique codes. Filters can be used to discriminate between different fluorescent specifies, as shown in FIG. 1. FIG. 1 is a fluorescent emission graph illustrating three fluorescent nanoparticles that could be present in the ink. Each has differing emission wavelengths, a yellow (500 nm), an orange (580 nm) and a near infrared (700 nm), which can be individually viewed by using filters with the corresponding bandpasses, 525 nm to 550 nm, 575 nm to 610 nm, and 675 nm to 800 nm, respectively. The integration of the fluorescent emission under each filter generates a unique level. By varying the constituents and varying the concentration in the ink, an unlimited number of unique codes can be generated.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A water-based ink for use in an ink jet printer for printing machine readable indicia on a substrate, the ink jet ink comprising:

fluorescent nanoparticles having a diameter between about 30 nm and about 100 nm; and an aqueous liquid vehicle comprising water and a water soluble vehicle in sufficient amounts to achieve an ink viscosity and surface tension effective for application of the ink jet ink to the substrate in a predetermined pattern by ink jet printing, wherein the ink is a postal ink wherein the fluorescent nanoparticles are polymeric based nanoparticles, further comprising, in weight percent, about 0.2% triethanolamine, about 2% fluorescent nanoparticles, about 5% triethylene glycol mono-n-butyl ether, about 10% ethylene glycol, and balance of water.

2. The water-based ink of claim 1, wherein the nanoparticles are selected from the group consisting of: polystyrene based particles and polyacrylinitrile based particles.

3. The water-based ink of claim 1, wherein the fluorescent ink comprises the polymeric based nanoparticles stained with at least one of a fluorescent dye and a phosphorescent dye.

4. The water-based ink of claim 1 wherein the ink is a visible or invisible ink.

5. The water-based ink of claim 1, further comprising addition of 2 weight percent of a dye, wherein the amount of the water is adjusted accordingly.

6. The water-based ink of claim 5, wherein the ink is a visible red ink.

7. The water-based ink of claim 1, wherein the fluorescent nanoparticles are employed as a taggant.

8. The water-based ink of claim 1, wherein multiple different nanoparticles are employed for coding.

9. The water-based ink of claim 1, wherein the ink jet printer comprises a nozzle having a diameter and the nanoparticles have a diameter between about 100 to about 250× smaller than the diameter of the nozzle.

10. The water-based ink of claim 1, comprising at least one of a fluorescence stabilizer, a surfactant, an amine, a glycol ether.

11. A water-based ink for use in an ink jet printer for printing machine readable indicia on a substrate, the ink jet ink comprising:

fluorescent nanoparticles having a diameter between about 30 nm and about 100 nm; and an aqueous liquid vehicle comprising water and a water soluble vehicle in sufficient amounts to achieve an ink viscosity and surface tension effective for application of the ink jet ink to the substrate in a predetermined pattern by ink jet printing, further comprising, in weight percent, about 0.2% triethanolamine, about 10% fluorescent nanoparticles, about 5% triethylene glycol mono-n-butyl ether, about 10% ethylene glycol, and balance of water.

12. The water-based ink of claim 11, wherein the ink is a postal ink.

13. A water-based ink for use in an ink jet printer for printing machine readable indicia on a substrate, the ink jet ink comprising:

fluorescent nanoparticles having a diameter between about 30 nm and about 100 nm; and an aqueous liquid vehicle comprising water and a water soluble vehicle in sufficient amounts to achieve an ink viscosity and surface tension effective for application of the ink jet ink to the substrate in a predetermined pattern by ink jet printing, further comprising, in weight percent, about 0.2% triethanolamine, between about 2% and about 10% fluorescent nanoparticles, about 5% triethylene glycol mono-n-butyl ether, about 10% ethylene glycol, and balance of water.

* * * * *